United States Patent Office 3,514,222
Patented May 26, 1970

3,514,222
METERING PISTON PUMP
Georgy Petrovich Korotkov, Ul. 51, korp. 5, kv. 90, and Ernst Yakovlevich Sapozhnikov, Ul. Boitsova 2a, korp. 3, kv. 71, both of Moscow, U.S.S.R.
Filed Dec. 13, 1967, Ser. No. 690,240
Int. Cl. F04b 49/00, 7/06, 9/04
U.S. Cl. 417—214                                      2 Claims

ABSTRACT OF THE DISCLOSURE

A metering piston pump is provided in which a cylinder rotates on a distributing plate through the intermediary of a rigidly connected gear wheel cooperating with a driving shaft, there being a spring-biased piston reciprocating in the cylinder under the action of a leverage essentially constituted as a two-arm lever coupled to the piston and to a follow-up end roller displaceable on a guide block mounted concentrically with respect to the cylinder. A stop is provided to control the piston stroke and the stop is connected with a capacity indicator and an automatic control system, including a metering sensor, an amplifier, an electric motor turnable through a preset angle upon receiving a mismatch signal from the sensor and displacing the stop through a toothed gear, and a feedback means fashioned as a differential transformer coupled to the movable stop and rigidly connected with the mechanism of the capacity indicator.

---

This invention relates to liquid metering devices and more specifically to metering piston pumps.

In the known metering piston pumps, the piston is reciprocated by means of a crank mechanism. The suction and discharge stages are accomplished by means of valves. The piston rod is sealed by a gland. The amount of the delivered liquid is controlled by changing the piston stroke which is effected by manual adjustment of the eccentricity of the crank mechanism. In one known arrangement the piston stroke, can be changed only after stopping the motor (see, for example, "Automatic Metering of Reagents for Sewage Water Processing and Water Treatment" by D. N. Smirnov & A. S. Dmitriev, Moscow 1965, p. 110).

The basic disadvantages of the known metering pumps of the above-mentioned type reside in insufficient reliability caused by the accumulation of deposits on the valves and clogging of the latter; difficulties in adjusting the pump capacity because of the necessity to stop the pump for adjustments; leakage of the liquid through the rod gland; discrepancy of the suction and delivery characteristics in case of nonlinear control characteristics of the technological processes; complicated design of the pump capacity adjusting device.

An object of the present invention resides in eliminating the afore-mentioned disadvantages and providing a metering pump which combines a relatively simple design and small size with sufficient dependability in metering any liquid and freeflowing pastes laden with mechanical impurities and with provision for adjusting the suction and delivery stages.

According to the invention this object is carried into effect by providing a pump whose cylinder is made rotatable in relation to a distributing plate elastically pressed against said cylinder and having holes for the delivery and discharge of the handled liquid, said holes communicating alternately with a hole in the cylinder bottom. The cylinder is provided with a circular guide, and one of the arms of a two-arm lever is held against said block, the other arm of said lever imparting reciprocating motion to the piston in conformity with the contour of the guide block.

In a preferable embodiment of the metering pump, according to the invention, it is desirable to install a movable stop above the arm of the two-arm lever imparting reciprocating motion to the piston, this stop being intended for adjusting the suction stroke.

If the metering pump is provided with an automatic capacity control system, it is practicable to connect a feedback sensing element to the movable stop.

It is desirable that the sensing unit of the restoring mechanism should be made in the form of a differential transformer.

It is expedient to connect the core of the feedback sensing unit to the capacity indicator mechanism. It is desirable that the movable stop should be driven by a phase-sensitive reversible electric motor whose control windings are connected to the output stage of an electronic regulator.

A pilot specimen of the metering pump built according to the invention is 438 x 300 x 275 mm. in size and its capacity is 30 l./hr. at a pressure up to 5 atm.

The accompanying drawing illustrates, an exemplary embodiment of the metering pump according to the invention, in which.

Figure 1:
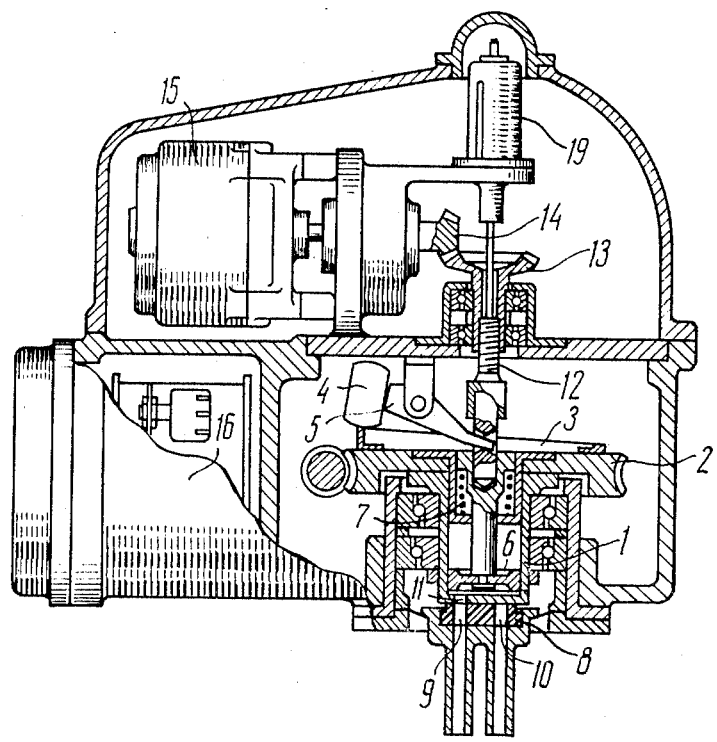
FIG. 1 is a longitudinal section of the metering pump.

The metering pump comprises a cylinder 1 (FIG. 1) connected to a gear wheel 2 which mounts a circular guide block 3. Rolling along the circular guide block 3 is a roller 4 installed on one arm of the lever 5. The other arm of the lever 5 imparts translational motion to the piston 6. The return motion of the piston 6 is ensured by a spring 7. Elastically pressed against the bottom of the cylinder 1 is a distributing plate 8 with a suction hole 9 and delivery hole 10. The cylinder 1 has a hole 11 which, in the course of rotation of the cylinder 1 is put alternately in communication with the holes 9 and 10 in the distributing plate 8. The length of the piston upward stroke is adjusted by a movable stop 12 in the form of a screw. The stop 12 is moved by rotating a nut having the shape of a bevel gear 13 meshing with a smaller bevel pinion 14 fitted on the output shaft of the reduction gear (not shown in the drawing) built into a reversible electric motor 15 controlled by an electronic regulator 16.

In the case of automatic capacity control, the movable stop 12 is moved by the phase-sensitive reversible electric motor 15 whose control winding is connected as a load to the output stage (not shown in the drawing) of the electronic regulator 16.

Figure 2:
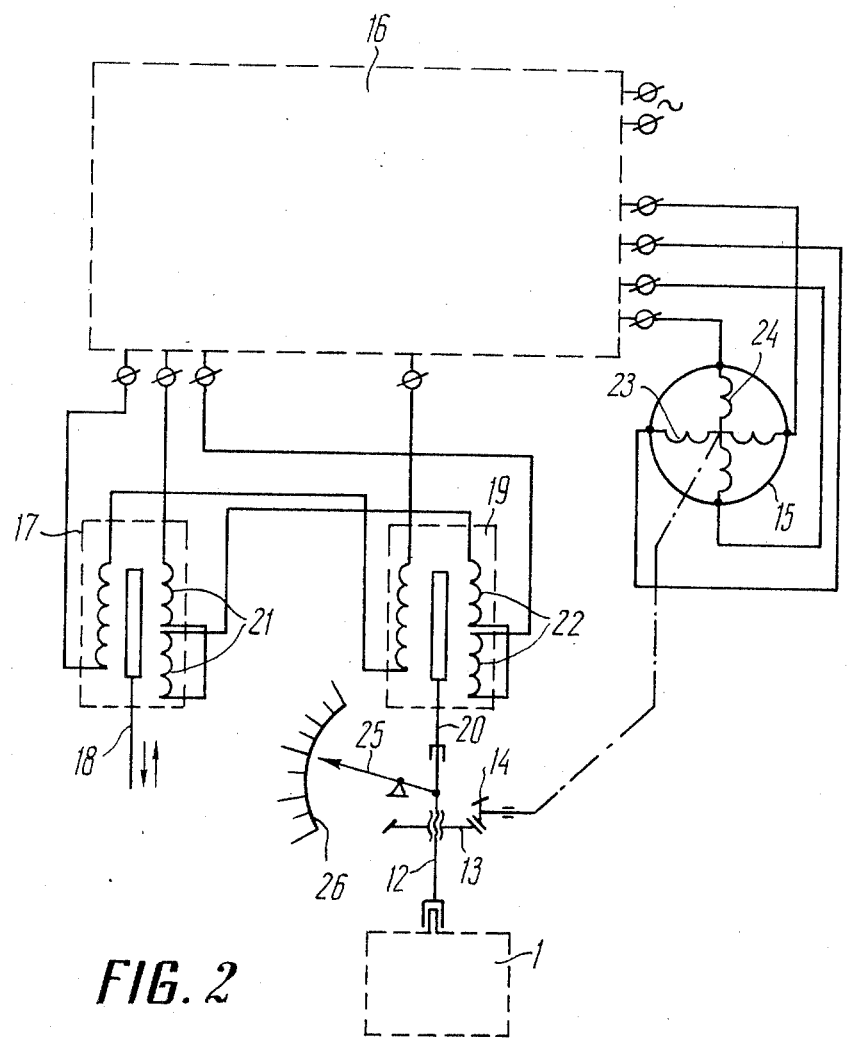
FIG. 2 is an elementary diagram of the automatic capacity control system of the metering pump.

A differential transformer 17 (FIG. 2) with a movable core 18 is used a pickup for the parameter controlled.

A feedback sensing unit 19 is constituted as a differential transformer whose core 20 is connected to the movable stop 12.

If the position of the cores 18 and 20 is mismatched with that of the coils of secondary windings 21 and 22 in the differential transformers 17 and 19, this creates a voltage difference on these windings which entering the input of the electronic regulator 16 actuates the electric motor 15 via the output stage of said regulator.

The direction of rotation of the electric motor 15 is determined by the phase shift of the current flowing through a control winding 23 with relation to the current in the field winding 24 of this motor. The motor 15 will continue rotating until the core 20 of the feed-back differential transformer 19 of the restoring mechanism occupies such a position relative to the coils of the secondary winding 22 in which their voltage equalizes and becomes shifted through 180° with respect to the voltage on the secondary winding 21 of the pickup differential transformer 17. The movement of the core 20 changes the pump capacity which is shown by the pointer 25 of a capacity indicator 26.

Thus, each signal at the input of the control system is compensated by the feedback mechanism and cancelled and the operation value will correspond to the preset value of the controlled parameter.

What we claim is:

1. A metering piston pump comprising a cylinder having a closed end with a hole therein, means for rotating said cylinder about the axis thereof, a distributing plate elastically urged against said closed end of the cylinder, said distributing plate having inlet and discharge holes communicating alternately with the hole in the end of said cylinder for the suction-entry and pressure discharge of a fluid therein, a piston slidably mounted in said cylinder, spring means acting on said piston, a circular guide block secured coaxially to the cylinder for rotation therewith, a follow roller on said guide block, a pivotal two-arm lever having one arm engaged with said roller and an opposite arm engaged with said piston to displace the piston against the opposition of the spring means in accordance with the contour of the guide block, an adjustable stop member positioned to limit the stroke of the piston, and an automatic control system for said stop member including an electric motor coupled to said stop member to displace the same upon rotation of the motor, sensing means for sensing the capacity of fluid handled by said pump and coupled to said motor to activate the same when a mismatch signal is produced upon variation of the capacity with respect to a preestablished capacity whereby the stop member is displaced to a position to compensate for said variation in capacity, and a feedback device comprising differential transformer elements respectively connected to said stop member and to said sensing means for producing the mismatch signal for activating the motor.

2. A pump as claimed in claim 1, wherein said automatic control system comprises an electronic regulator connected to said feedback device and to said motor, the latter having windings connected to the regulator at the output stage thereof.

References Cited
UNITED STATES PATENTS

| | | | |
|---|---|---|---|
| 2,139,155 | 12/1938 | Gernandt | 103—2 X |
| 2,910,943 | 11/1959 | Marshall et al. | 103—37 |
| 3,046,894 | 7/1962 | Machen | 123—140.3 X |
| 3,060,690 | 10/1962 | Horlacher | 103—38 |
| 3,282,217 | 11/1966 | Slover et al. | 103—11 |
| 3,302,752 | 2/1967 | Shiokawa | 103—213 X |
| 2,654,999 | 10/1953 | Berge | 60—53 |
| 2,977,765 | 4/1961 | Fillmore | 60—52 |
| 3,270,674 | 9/1966 | Allen | 103—38 |

WILLIAM L. FREEH, Primary Examiner

U.S. Cl. X.R.

92—13.1